United States Patent

Dupeu et al.

(10) Patent No.: US 12,006,873 B2
(45) Date of Patent: Jun. 11, 2024

(54) FUEL SUPPLY CIRCUIT OF AN AIRCRAFT ENGINE

(71) Applicant: SAFRAN HELICOPTER ENGINES, Bordes (FR)

(72) Inventors: Franck Albert Robert Dupeu, Moissy-Cramayel (FR); Jean-Marie André Robert Gigon, Moissy-Cramayel (FR); David Simon Serge Taieb, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/759,208

(22) PCT Filed: Jan. 15, 2021

(86) PCT No.: PCT/FR2021/050076
§ 371 (c)(1),
(2) Date: Jul. 21, 2022

(87) PCT Pub. No.: WO2021/152230
PCT Pub. Date: Aug. 5, 2021

(65) Prior Publication Data
US 2023/0064430 A1 Mar. 2, 2023

(30) Foreign Application Priority Data

Jan. 27, 2020 (FR) ..................................... 20 00765

(51) Int. Cl.
*F02C 7/236* (2006.01)
*F02C 7/26* (2006.01)
*F02C 9/30* (2006.01)

(52) U.S. Cl.
CPC ................ *F02C 7/236* (2013.01); *F02C 7/26* (2013.01); *F02C 9/30* (2013.01); *F05D 2220/76* (2013.01)

(58) Field of Classification Search
CPC .. F02C 7/236; F02C 7/22; F02C 7/222; F02C 7/2365; F02C 9/30; F01D 15/08; F01D 15/10; F04D 13/12
See application file for complete search history.

(56) References Cited

U.S. PATENT DOCUMENTS

| | | | | |
|---|---|---|---|---|
| 4,526,518 A | * | 7/1985 | Wiernicki | F02M 37/08 417/420 |
| 5,118,258 A | * | 6/1992 | Martin | F02C 7/236 60/734 |

(Continued)

FOREIGN PATENT DOCUMENTS

| | | |
|---|---|---|
| EP | 2 088 302 A2 | 8/2009 |
| FR | 2 983 248 A1 | 5/2013 |

OTHER PUBLICATIONS

International Search Report dated Jul. 9, 2021 in PCT/FR2021/050076, filed on Jan. 15, 2021, 2 pages.

*Primary Examiner* — Alain Chau
(74) *Attorney, Agent, or Firm* — Oblon, McClelland, Maier & Neustadt, L.L.P.

(57) ABSTRACT

A fuel supply circuit of an aircraft engine includes a centrifugal pump mechanically coupled with an engine shaft delivering mechanical power. The circuit further includes at least one electromagnetic pump including at least one stator delimiting an annular internal volume in which is present a rotor able to drive a fluid, a plurality of magnets annularly distributed on the rotor and at least a plurality of coils annularly distributed inside the stator face-to-face with the magnets. The rotor is connected to the engine shaft by a one-way clutching element.

6 Claims, 10 Drawing Sheets

(56) References Cited

U.S. PATENT DOCUMENTS

| | | | | |
|---|---|---|---|---|
| 5,407,331 A * | 4/1995 | Atsumi | | F02M 37/048 |
| | | | | 417/423.12 |
| 7,841,164 B2 * | 11/2010 | Emo | | F02C 9/26 |
| | | | | 60/734 |
| 7,950,907 B2 * | 5/2011 | Nagata | | F04D 29/406 |
| | | | | 417/423.1 |
| 10,174,760 B2 * | 1/2019 | Brookes | | F04C 2/084 |
| 10,197,062 B2 * | 2/2019 | Brookes | | F02K 3/06 |
| 10,378,445 B2 * | 8/2019 | Edwards | | H02K 16/00 |
| 10,393,007 B2 * | 8/2019 | Kraemer | | F02B 37/24 |
| 10,526,973 B2 * | 1/2020 | Waissi | | F02C 7/236 |
| 10,669,943 B2 * | 6/2020 | Weir | | F02C 9/26 |
| 11,629,652 B2 * | 4/2023 | Reuter | | F02C 9/30 |
| | | | | 60/39.281 |
| 2004/0232702 A1 * | 11/2004 | He | | H02K 7/1815 |
| | | | | 290/31 |
| 2009/0071442 A1 * | 3/2009 | Emo | | F02C 9/26 |
| | | | | 123/446 |
| 2009/0199823 A1 | 8/2009 | Mahoney et al. | | |
| 2010/0047088 A1 * | 2/2010 | Martin | | F04C 2/3445 |
| | | | | 417/410.1 |
| 2010/0111731 A1 * | 5/2010 | Suzuki | | F04D 13/06 |
| | | | | 417/423.7 |
| 2010/0130327 A1 | 5/2010 | Morgan, Jr. | | |
| 2012/0210716 A1 * | 8/2012 | Weir | | F02C 7/22 |
| | | | | 60/734 |
| 2014/0219826 A1 | 8/2014 | Clements | | |
| 2014/0291987 A1 * | 10/2014 | Dooley | | H02K 16/04 |
| | | | | 290/34 |
| 2014/0298819 A1 | 10/2014 | Lindeman et al. | | |
| 2015/0204327 A1 * | 7/2015 | Pribanic | | F04C 2/3445 |
| | | | | 417/420 |
| 2015/0315980 A1 * | 11/2015 | Edwards | | F02C 9/30 |
| | | | | 60/740 |
| 2016/0109133 A1 * | 4/2016 | Edwards | | F04D 13/06 |
| | | | | 60/746 |
| 2016/0333775 A1 * | 11/2016 | Kraemer | | F02B 39/10 |
| 2017/0114787 A1 * | 4/2017 | Brookes | | F04D 29/5806 |
| 2017/0167387 A1 * | 6/2017 | Weir | | F02C 9/26 |
| 2017/0184095 A1 * | 6/2017 | Brookes | | F04C 29/0085 |
| 2017/0184111 A1 * | 6/2017 | Brookes | | F04D 1/00 |
| 2018/0128268 A1 * | 5/2018 | Bornemann | | F04C 15/008 |
| 2019/0376454 A1 * | 12/2019 | Medoro | | F04C 2/102 |
| 2021/0239054 A1 * | 8/2021 | Reuter | | F02C 7/232 |

* cited by examiner

FUEL SUPPLY CIRCUIT OF AN AIRCRAFT ENGINE

TECHNICAL FIELD

This invention relates to the field of turbomachines of the type comprising a rotary body comprising an engine shaft delivering mechanical power.

The invention is applicable to any type of turbomachine, in particular those used in aircraft such as turbojet engines, turboprops, and ductless fan turbomachines, also known as "Open Rotor" turbomachines.

PRIOR ART

A conventional turbomachine includes in a known manner one or more rotary bodies. Each rotary body comprises a compressor, a turbine and an engine shaft linking the turbine to the compressor to drive the compressor in rotation. A part of the power generated by the turbomachine is used to drive different accessories (or auxiliary machines) required for the operation of the turbojet engine or of the aircraft, such as for example a lubrication pump or a fuel pump.

For this purpose, the turbomachine generally comprises a gear box (Accessory Gear Box) connecting the engine shaft to the pumps. When the engine shaft is rotationally driven, the accessory gear box transmits the rotational movement to the different accessories. In other words, the mechanical energy produced by the engine shaft is transmitted to the pumps by the accessory gear box.

This technical solution does however have drawbacks. Specifically, the rotation speed of the pump or pumps is dependent on the rotation speed of the engine shaft, the pump or pumps not being able to be controlled at an independent engine rating. This can be problematic when it concerns, for example, the fuel supply circuit of the turbomachine. Specifically, the flow rate of the pump or pumps present in the supply circuit is dependent on the engine rating, which does not always make it possible to optimize the fuel flow rate to the engine requirements, in particular during the start-up of the turbomachine.

SUMMARY OF THE INVENTION

The invention in particular has the aim of supplying a turbomachine that does not have the aforementioned drawbacks.

This aim is achieved owing to a fuel supply circuit of an aircraft engine comprising at least one centrifugal pump mechanically coupled with an engine shaft delivering mechanical power, characterized in that it further comprises at least one electromagnetic pump comprising at least one stator delimiting an annular internal volume in which is present a rotor able to drive a fluid, a plurality of magnets annularly distributed on the rotor and at least a plurality of coils annularly distributed inside the stator face-to-face with the magnets and in that the rotor is connected to the engine shaft by a one-way clutching element.

The selective coupling of an electromagnetic pump with a centrifugal pump in the fuel supply circuit of the invention makes it possible to provide new functionality while retaining a high level of reliability. Since the electromagnetic pump is fueled with a source of electrical energy independent of the mechanical energy supplied to the engine shaft when the turbomachine is started, it can be advantageously used to fill the fuel circuit (priming) before engine start-up. The fuel flow rate can also be adjusted by the electromagnetic pump, and this independently of the engine rating, which allows a control of the flow rate that fits the fuel requirement as closely as possible while limiting fuel recirculation.

According to a particular feature of the circuit of the invention, the rotor comprises a wheel equipped with a plurality of vanes, the magnets of the plurality of magnets being retained at the level of the radially outer ends of the vanes of the wheel, the coils of the plurality of coils being face-to-face with the magnets of the plurality of magnets along a radial direction.

According to another particular feature of the circuit of the invention, the rotor comprises an inner pinion interacting with an outer ring with an inner toothing, the magnets of the plurality of magnets being retained at the level of the outer periphery of the outer ring, the coils of the plurality of coils being face-to-face with the magnets of the plurality of magnets along a radial direction.

By placing the plurality of permanent magnets and the plurality of coils face-to-face along the radial direction, the axial bulk of the pump is greatly optimized. A very compact pump is thus obtained.

According to another particular feature of the circuit of the invention, the rotor comprises a wheel provided with a plurality of vanes, the magnets of the plurality of magnets being retained at the level of the outer periphery of the wheel, the coils of the plurality of coils being face-to-face with the magnets along an axial direction.

According to another particular feature of the circuit of the invention, the rotor comprises an inner pinion interacting with an outer ring with an inner toothing, the magnets of the plurality of magnets being retained at the level of the outer periphery of the outer ring, the coils of the plurality of coils being face-to-face with the magnets along an axial direction.

According to another particular feature of the circuit of the invention, the rotor comprises an inner pinion interacting with an outer ring with an inner toothing, the magnets of the plurality of magnets being retained on the inner pinion, the coils of the plurality of coils being face-to-face with the magnets along an axial direction.

By placing the plurality of permanent magnets and the plurality of coils face-to-face along the axial direction, the radial bulk of the pump is greatly optimized. A very compact pump is thus obtained.

According to another particular feature of the circuit of the invention, each electromagnetic pump comprises first and second pluralities of coils present on either side of the wheel, or outer ring, or inner pinion respectively, the coils of the first and second pluralities of coils being face-to-face with the magnets along the axial direction. Two pluralities of coils make it possible to ensure redundancy in the event of a fault or malfunction of one plurality of coils. The redundancy of the plurality of coils can also be used to double the power of the electromagnetic fields to which the permanent magnets are submitted.

According to another particular feature of the circuit of the invention, the magnets of the plurality of magnets are angularly disposed as a Halbach structure. This particular disposition makes it possible to increase the magnetic field on the outer side of the rotor while the magnetic field of the inner side of the rotor is substantially suppressed. In this way the magnetic field loss is reduced, which improves the controlling of the rotor by the coils.

According to another particular feature of the circuit of the invention, each electromagnetic pump is able to generate an electrical current. This makes it possible to store electrical energy when the electromagnetic pump is not used for pumping.

Another subject of the invention is an aircraft engine including a fuel supply circuit according to the invention.

Another subject of the invention is the use of the fuel supply circuit according to the invention for the fuel supply of an aircraft engine, said circuit being connected to a fuel reservoir without any priming pump.

DESCRIPTION OF THE EMBODIMENTS

The invention is generally applicable to any turbomachine comprising a rotary body comprising an engine shaft delivering mechanical power and at least one centrifugal pump mechanically coupled with the engine shaft.

Figure 1:
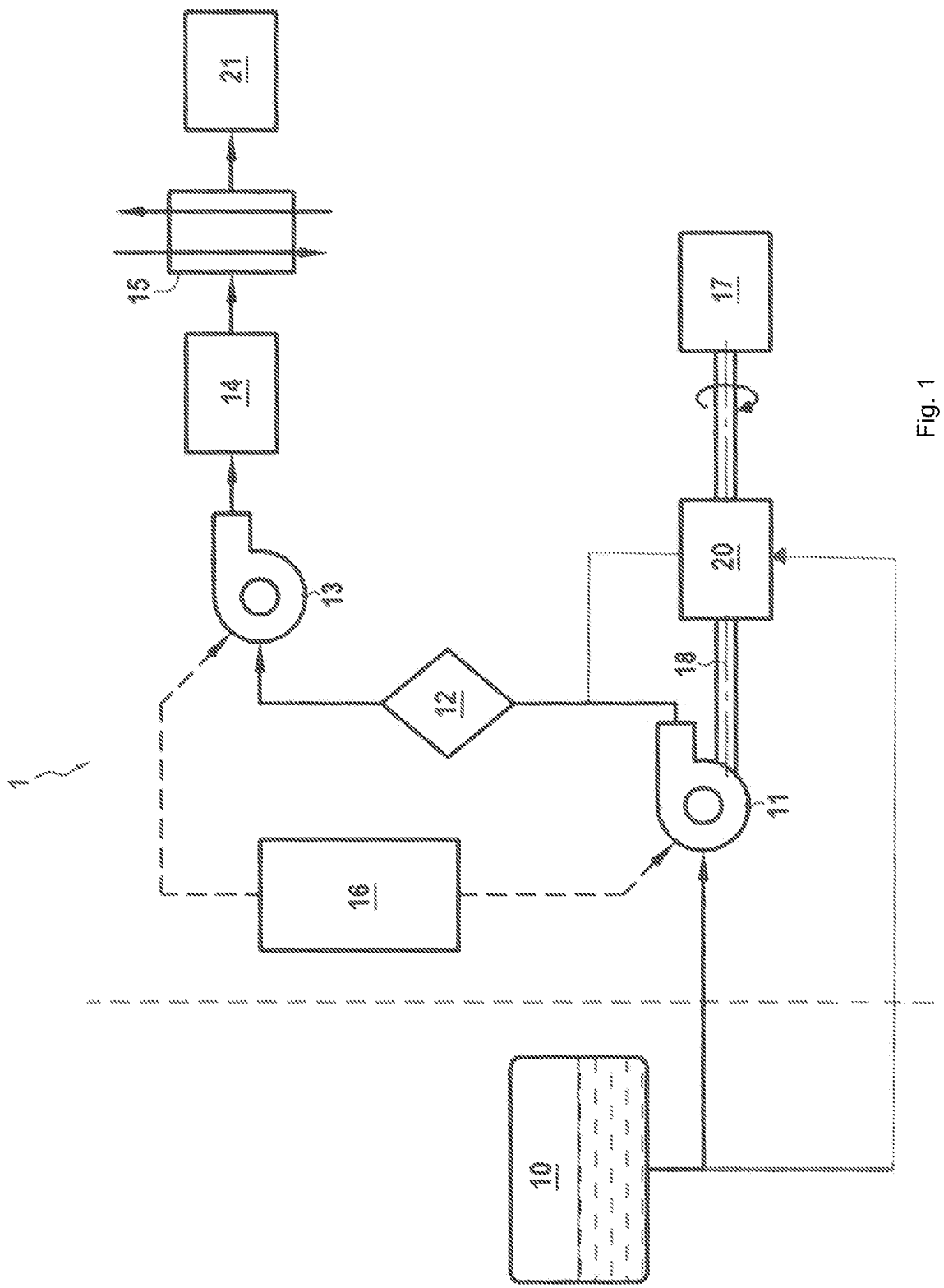
FIG. 1 is a schematic representation of a fuel supply of a gas turbine aircraft engine.

FIG. 1 illustrates an example of a fuel supply circuit 1 which is described in the context of an application to a turbomachine equivalent to a gas turbine aircraft engine.

The fuel supply circuit 1 connects a fuel reservoir 10 of an aircraft to a combustion chamber 21 of a turbomachine. The fuel supply circuit 1 is here composed of a low-pressure pump 11 connected to the tank 10, a filter 12, a high-pressure pump 13, a metering device 14 and an oil/fuel heat exchanger 15 connected to the combustion chamber 21. The turbomachine particularly comprises an accessory gear box 17 to which is connected an engine shaft 18 intended to deliver mechanical power. The low-pressure pump 11 and the high-pressure pump 13 are centrifugal pumps mechanically coupled to the engine shaft.

In accordance with the invention, an electromagnetic pump 20 is moreover associated here with the low-pressure centrifugal pump 11. The electromagnetic pump 20 is for example of the liquid ring type or of the side channel or regenerative type, or of the gerotor type, controlled independently, for example, by the digital computer 16 integrated into the controlling device of the turbomachine. As described hereinafter in detail the rotor of the electromagnetic pump 20 is connected to the engine shaft 18 by a one-way clutching element.

The low-pressure centrifugal pump 11 and the electromagnetic pump 20 are both connected to the fuel supply circuit. More specifically, the inlet of the pumps 11 and 20 is connected to the fuel reservoir 10 while the outlet of the pumps 11 and 20 is connected to the filter 12 such that the turbomachine can be supplied with fuel by the low-pressure centrifugal pump 11, or by the electromagnetic pump 20, or by both pumps 11 and 20 simultaneously.

There will now follow a description of different embodiments of an electromagnetic pump which can be used in this invention, such as for example for the electromagnetic pump 20 described hereinabove.

Figure 2:
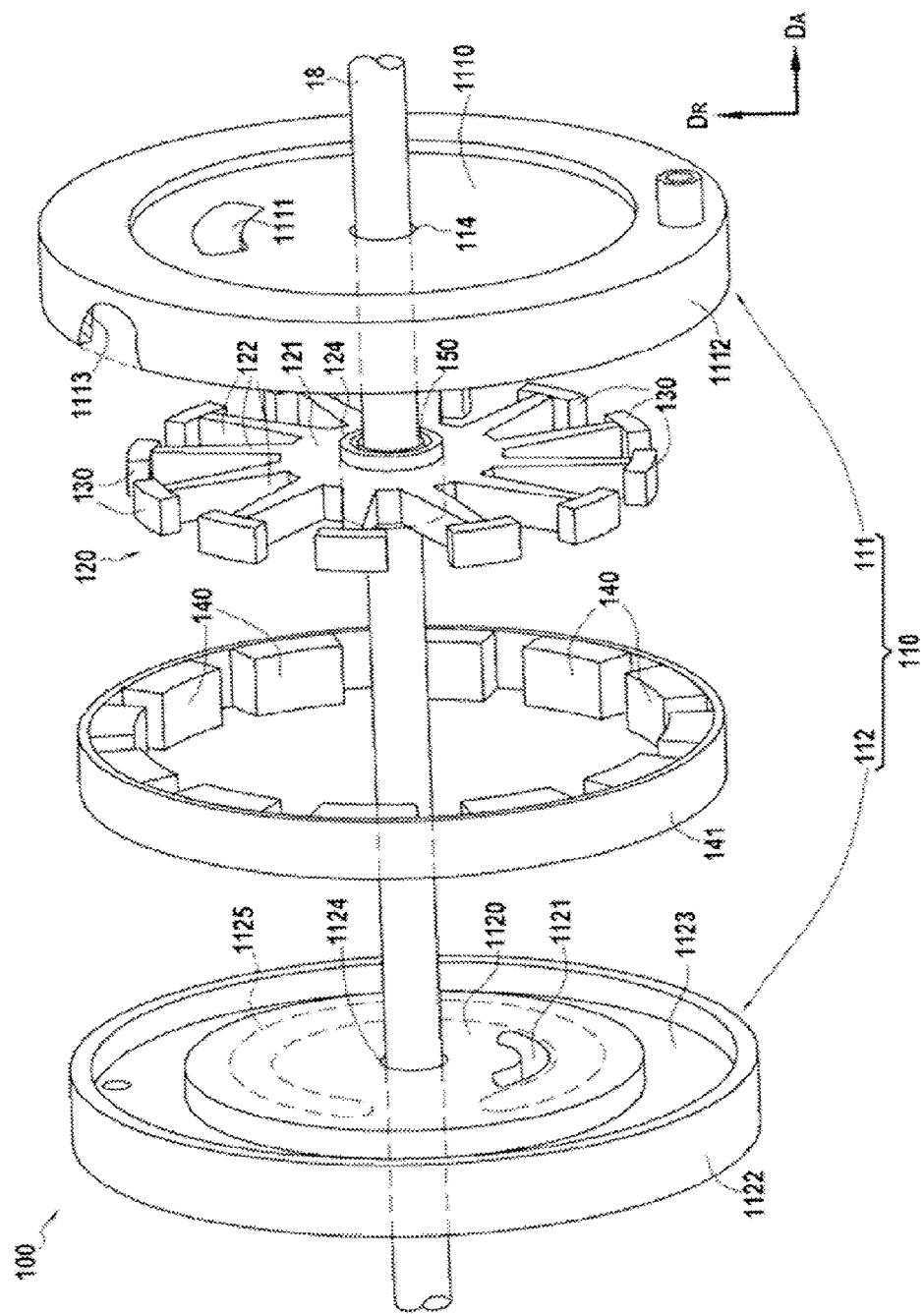
FIG. 2 is a schematic exploded perspective view of an electromagnetic pump in accordance with an embodiment of the invention.

FIG. 2 illustrates an electromagnetic pump 100 in accordance with an embodiment of the invention. In the example described here, the electromagnetic pump 100 is a pump of liquid ring type comprising a fixed pump body or stator 110 consisting of a half-casing 111 and a half-casing 112. The half-casings 111 and 112 include a solid cylindrical central part 1110 and 1120 respectively, equipped with a suction/discharge port 1111 and 1121 respectively, and a circular outer wall 1112 and 1122 respectively, extending concentrically around the central part 1110, and 1120 respectively. An annular housing 1113 and 1123 respectively is delimited between the central part 1110 and 1120 respectively, and the outer wall 1112 and 1122 respectively.

The electromagnetic pump 100 also comprises a vaned wheel or rotor 120 comprising a rotor 121 equipped with a plurality of vanes 122 extending from the wheel along a radial direction $D_R$. The vaned wheel 120 includes a bearing 124. Openings 1114 and 1124 are present on the half-casing 111 and the half-casing 112 respectively. The bearing 1124 is intended to interact with a free wheel 150 here forming the one-way clutching element connecting the engine shaft 18 to the vaned wheel 120 of the electromagnetic pump 100, the openings 1114 and 1124 allowing the passing of the engine shaft 18.

In pumps of liquid ring type, the free wheel 150 is placed eccentrically on the vaned wheel 120 for example by means of a spacer (not shown in FIG. 2) in such a way as to create variations of inter-vane (or inter-blade) volume which are used to suck up the pumped fluid, for example through the port 1111, then to expel it under pressure, for example through the port 1121. The pump 100 can also be a side channel pump, also known as a regenerative pump. In this case, a side channel 1125 (in dotted lines on FIG. 2) here present on the half-casing 112 extends between the ports 1111 and 1121. The change in the variations in inter-vane (or inter-blade) volume, associated with the speed field (vortex) present in the side channel 1125, makes it possible to suck up the fluid, for example through the port 1111, then to expel it under pressure, for example through the port 1121. The electromagnetic pump 100 further comprises a plurality of permanent magnets 130 annularly distributed on the vaned wheel or rotor 120 and a plurality of coils 140 annularly distributed inside the fixed pump body or stator 110. More specifically, in the example described here, the permanent magnets 130 are retained on the radially outer ends of the vanes 122 while the coils 140 are retained on the inner surface of a support ring 141, the assembly of coils and support ring being present both in the annular housing 1113 of the half-casing 111 and in the annular housing 1123 of the half-casing 112.

Figure 3:
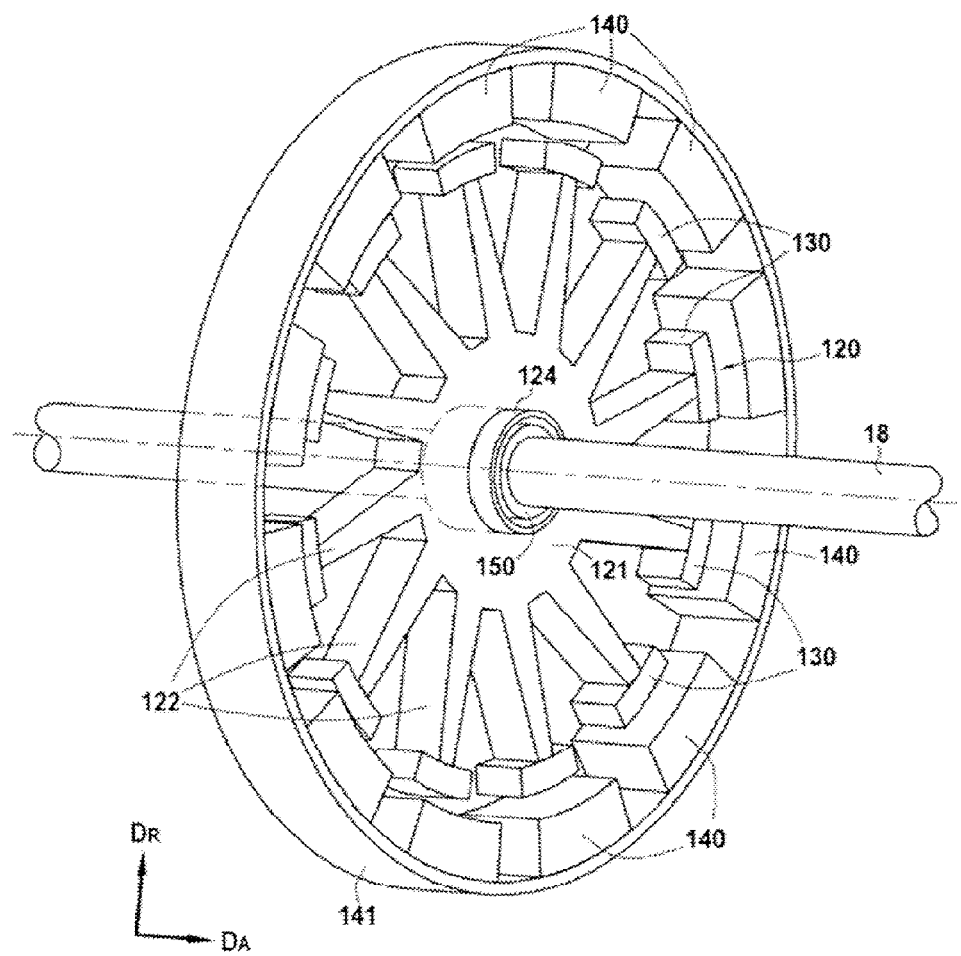
FIG. 3 is a schematic perspective view of a part of the electromagnetic pump of FIG. 2.

Once all the component elements of the pump 100 have been assembled, the permanent magnets 130 are located face-to-face with the coils 140 along a radial direction $D_R$ as illustrated in FIG. 3. The control of the electromagnetic pump 100 (torque and rotation speed) is done by controlling the current circulating through the Coils.

By attaching the permanent magnets directly 130 on the vaned wheel 120, a part of the driving means of the pump are directly integrated into the elements in movement, which makes it possible to obtain a high level of integration of the driving means and therefore a reduced overall bulk for the pump.

Furthermore, by placing the plurality of permanent magnets and the plurality of coils face-to-face along the radial direction, the radial bulk of the pump is greatly optimized. One thus obtains a very compact pump which can be driven independently with respect to the engine rating of the turbomachine with which it is associated.

Figure 4:
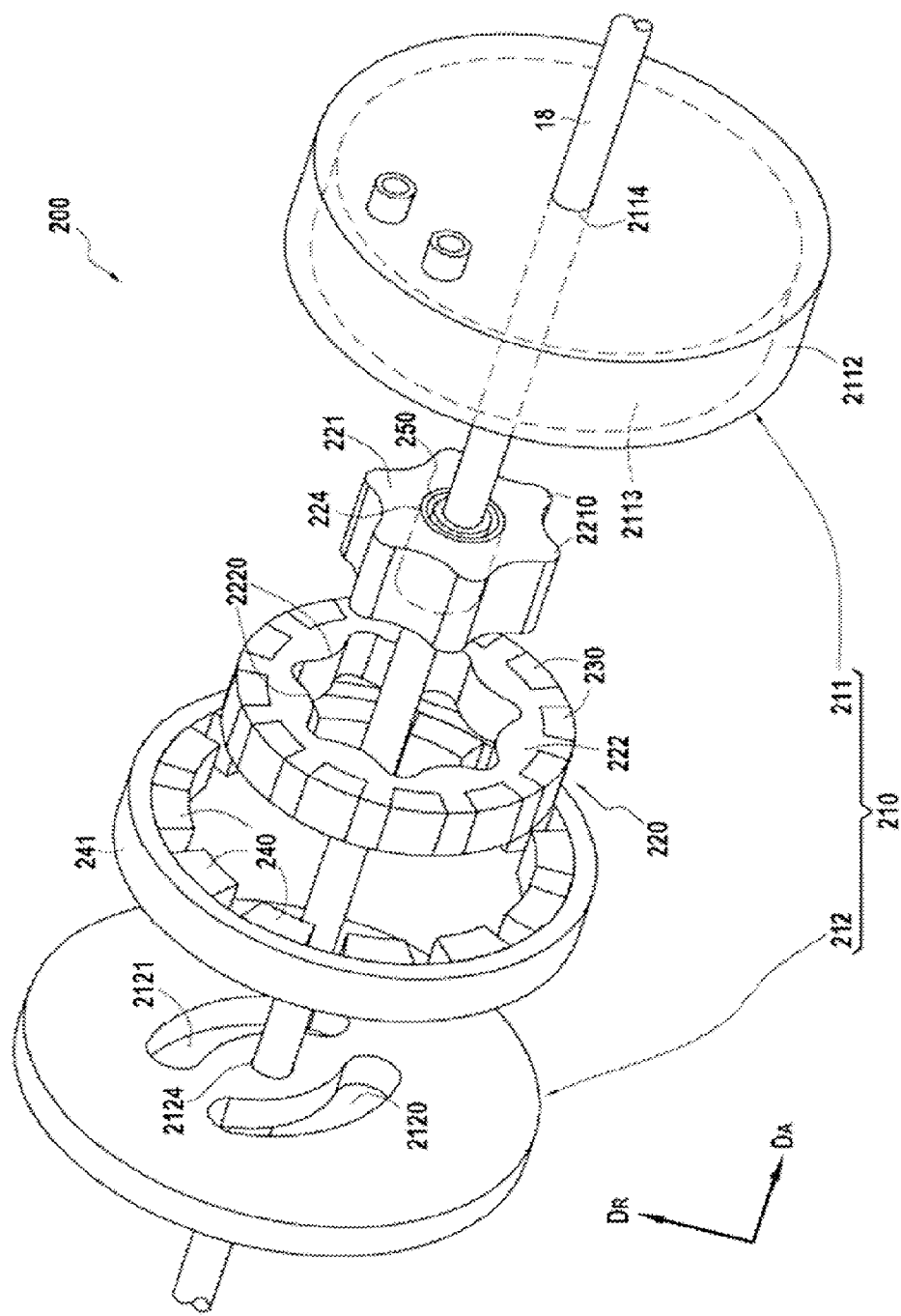
FIG. 4 is a schematic exploded perspective view of an electromagnetic pump in accordance with another embodiment of the invention.

FIG. 4 shows an electromagnetic pump 200 in accordance with another embodiment of the invention. In this embodiment, the pump 200 is a pump of gerotor type comprising a fixed pump body or stator 210 composed of a casing 211 and a flange 212. The casing 211 includes an inner housing 2113 delimited by an outer wall 2112. The flange 212 includes a suction port 2120 and a discharge port 2121.

The electromagnetic pump 200 also comprises a rotor 220 comprising an inner pinion 221 and an outer ring 222. The inner pinion 221 comprises an outer toothing here composed of six teeth 2210 while the outer ring 222 comprises an inner toothing here composed of 7 teeth 2220. The inner pinion 221 includes a bearing 224. Openings 2114 and 2124 are present on the casing 211 and the flange 212 respectively. The bearing 224 is intended to interact with a free wheel 250 here forming the one-way clutching element connecting the engine shaft 18 to the rotor 220 of the electromagnetic pump 200, the openings 2114 and 2124 allowing the passing of the engine shaft 18.

In pumps of gerotor type, a fluid is sucked in from the port 2120 and discharged via the port 2121 by capsules created between the teeth 2210 and 2220 of the inner pinion 221 and of the outer ring 222 respectively upon the rotation of these two elements.

The electromagnetic pump 200 further comprises a plurality of permanent magnets 230 annularly distributed on the outer periphery of the outer ring 222 and a plurality of coils 240 annularly distributed inside the fixed pump body or stator 210. More specifically, the coils 240 are retained on the inner surface of a support ring 241, the assembly of coils and support ring being present in the inner housing 2113 of the casing 211.

Figure 5:
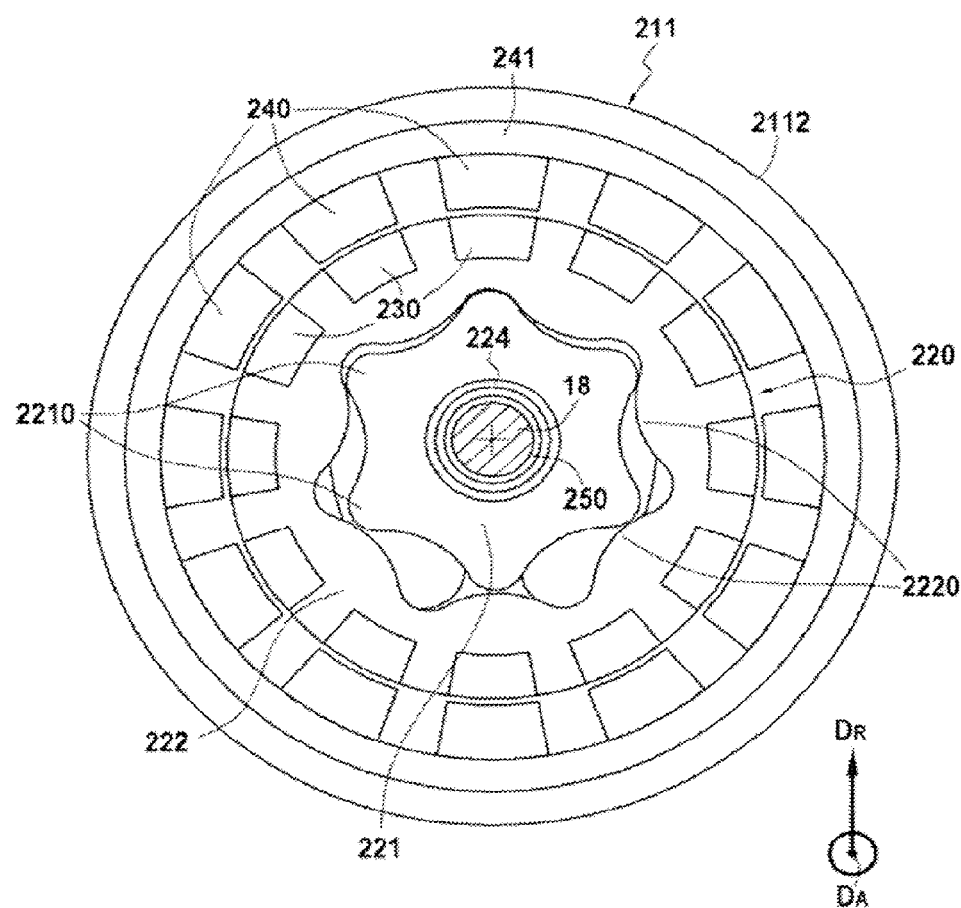
FIG. 5 is a schematic perspective view of a part of the electromagnetic pump of FIG. 4.

Once all the component parts of the pump 200 are assembled, the permanent magnets 230 are then located face-to-face with the coils 240 along a radial direction $D_R$ as illustrated in FIG. 5. The control of the electromagnetic pump 200 (torque and rotation speed) is produced by a current circulating through the coils.

By attaching the permanent magnets directly 230 to the inner pinion 221, a part of the driving means of the pump are directly integrated inside the elements in movement, which makes it possible to obtain a high level of integration of the driving means and therefore a reduced bulk for the pump.

Furthermore, by placing the plurality of permanent magnets and the plurality of coils face-to-face along the radial direction, the radial bulk of the pump is greatly optimized. One thus obtains a very compact pump which can be controlled independently with respect to the engine rating of the turbomachine with which it is associated.

Figure 6:
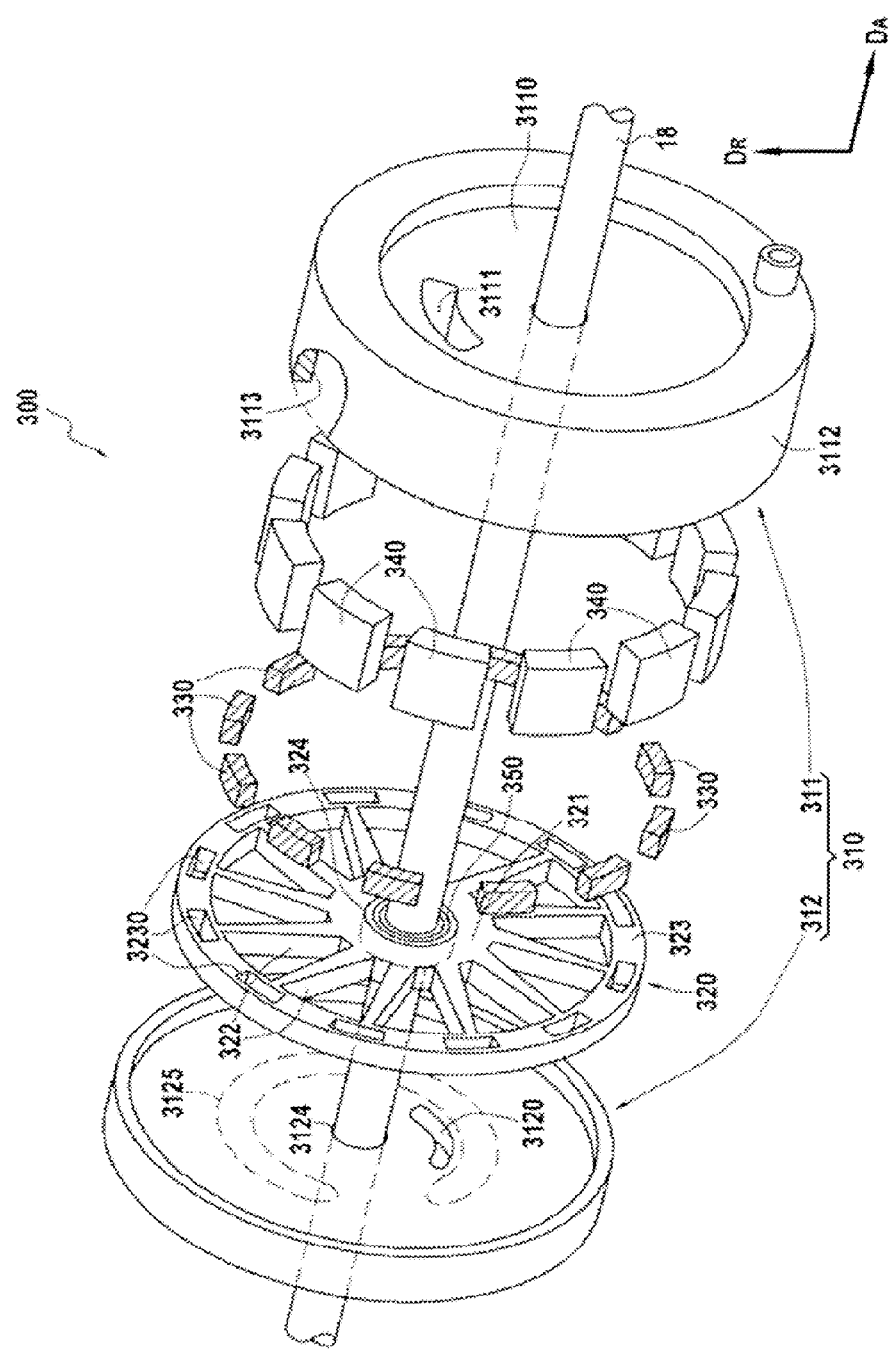
FIG. 6 is a schematic exploded perspective view of an electromagnetic pump in accordance with another embodiment of the invention.

FIG. 6 illustrates an electromagnetic pump 300 in accordance with another embodiment of the invention. In the example described here, the electromagnetic pump 300 is a pump of liquid ring type comprising a fixed pump body or stator 310 composed of a casing 311 and of a flange 312. The casing 311 includes a solid cylindrical central part 3110 equipped with a suction/discharge port 3111 and a circular outer wall 3112 extending concentrically around the central part 3110, annular housings 3113 being delimited between the center part 1110 and the outer wall 3112. The flange 312 includes a discharge/suction pump 3120.

The electromagnetic pump 300 also comprises a vaned wheel or rotor 320 comprising a wheel 321 equipped with a plurality of vanes 322 extending from the wheel along a radial direction $D_R$, a ring 323 being present at the level of the outer periphery of the wheel. In the example described here, the ring 323 is attached to the radially outer ends of the vanes 322.

The vaned wheel 320 includes a bearing 324. Openings 3114 and 3124 are present on the half-casing 311 and the half-casing 312 respectively. The bearing 324 is intended to interact with a free wheel 350 here forming the one-way clutching element connecting the engine shaft 18 to the vaned wheel 320 of the electromagnetic pump 300, the openings 3114 and 3124 allowing the passing of the engine shaft 18. The bearing 324 is placed eccentrically on the vaned wheel 320 in such a way as to create variations of inter-vane (or inter-blade) volume which make it possible to suck in the pumped fluid, for example through the port 3111 then to expel it under pressure, for example through the port 3120. The pump 300 can also be a side channel pump, also known as a regenerative pump. In this case, a side channel 3125 (in dotted lines on FIG. 6) here present on the flange 312 extends between the ports 3111 and 3120. The change in the variations in inter-vane (or inter-blade) volume, associated with the speed field (vortex) present in the side channel 3125, makes it possible to suck in fluid, for example through the port 3111, then to expel it under pressure, for example through the port 3120. The electromagnetic pump 300 further comprises a plurality of permanent magnets 330 annularly distributed on the vaned wheel or rotor 320 and a plurality of coils 340 annularly distributed inside the fixed pump body or stator 310. More specifically, in the example described here, the permanent magnets 330 are retained in housings 3230 present in the ring 323 while the coils 340 are retained in the annular housings 3113 present in the casing 311.

Once all the component elements of the pump 300 have been assembled, the coils 340 are then located face-to-face with the permanent magnets 330 along an axial direction $D_A$. The controlling of the electromagnetic pump 300 (torque and rotation speed) is provided by control of the current flowing through the coils.

By attaching the permanent magnets 330 directly onto the vaned wheel 320, a part of the drive means of the pump are directly integrated into the elements in movement, which makes it possible to obtain a high level of integration of the drive means and therefore a reduced overall bulk of the pump.

Furthermore, by placing the plurality of permanent magnets and the plurality of coils face-to-face along the axial direction, the radial bulk of the pump is greatly optimized. One thus obtains a very compact pump which can be controlled independently with respect to the engine rating of the turbomachine with which it is associated.

Figure 7:
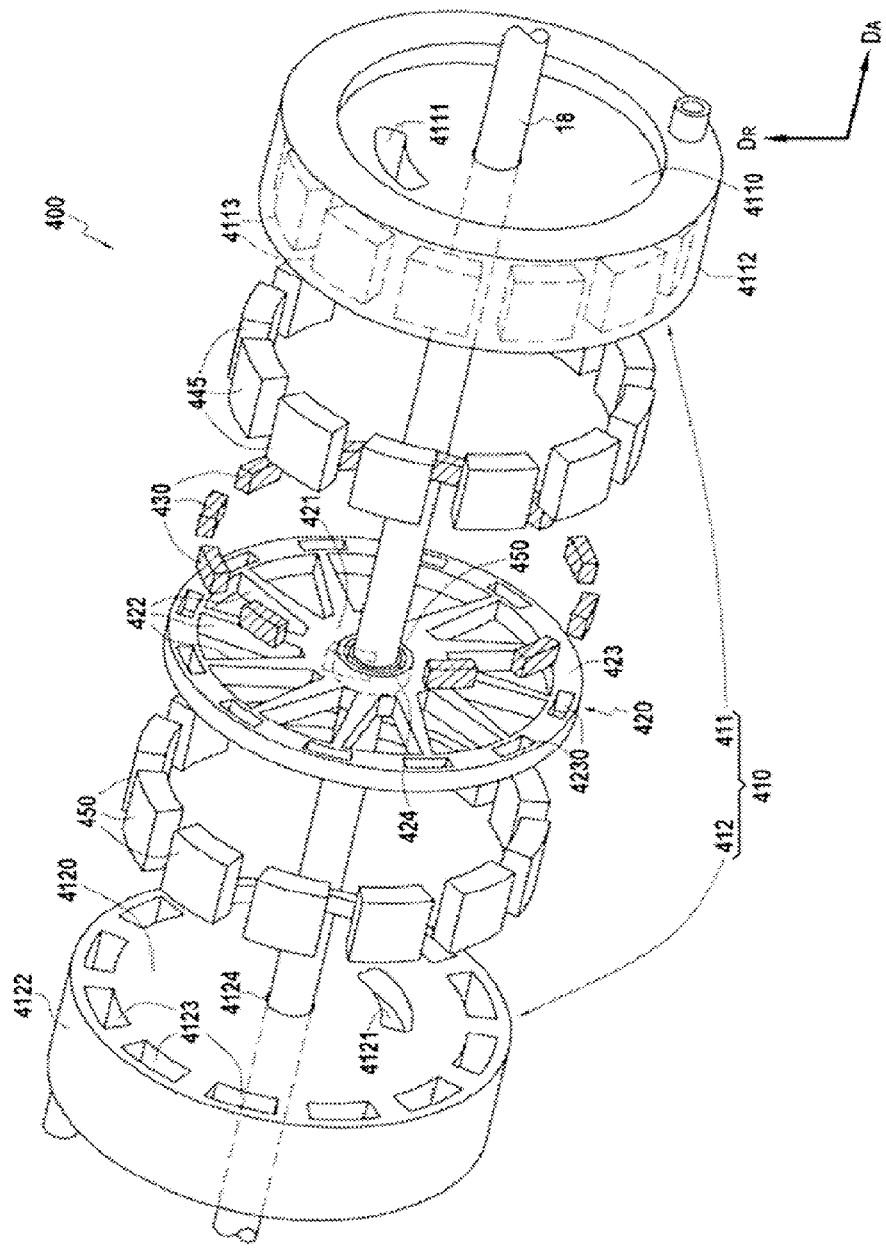
FIG. 7 is a schematic exploded perspective view of an electromagnetic pump in accordance with another embodiment of the invention.

FIG. 7 illustrates another embodiment of an electromagnetic pump 400 which differs from the electromagnetic pump 300 described in relation with FIG. 6 in that it comprises a double coil. More specifically, as for the pump 300, the pump 400 comprises a vaned wheel or rotor 420 comprising a wheel 421 equipped with a plurality of vanes 422 extending from the wheel along a radial direction $D_R$, a ring 423 attached to the radially outer ends of the vanes 422.

The electromagnetic pump 400 also comprising a fixed pump body or stator 410 composed of a first casing 411 and of a second casing 412. The casings 411 and 412 each respectively include a solid cylindrical central part 4110, 4120 equipped with a suction/discharge port 4111, 4121 and a circular outer wall 4112, 4122 extending concentrically around the central part 4110, 4120. First annular housings 4113 are delimited in the first casing 411 between the central part 4110 and the outer wall 4112. Second annular housings 4123 are delimited in the second casing 412 between the central part 4120 and the outer wall 4122.

The electromagnetic pump 400 further comprises a plurality of permanent magnets 430 annularly retained in housings 4230 present in the ring 423 and first and second pluralities of coils 440 and 445. The first plurality of coils 440 is annularly distributed in the first annular housings 4113 while the second plurality of coils 445 is annularly distributed in the second annular housings 4123.

The vaned wheel 420 includes a bearing 424. Openings 4114 and 4124 are present on the half-casing 411 and the half-casing 412 respectively. The bearing 424 is intended to interact with a free wheel 450 here forming a one-way clutching element connecting the engine shaft 18 to the vaned wheel 420 of the electromagnetic pump 400, the openings 4114 and 4124 allowing the passing of the engine shaft 18.

Once the pump 400 has been assembled, the first and second pluralities of coils 440 and 445 are present on either side of the wheel 420 respectively and face-to-face with the magnets along an axial direction $D_A$.

Besides the advantages of integration and compactness already set out above for the pump 300, the electromagnetic pump 400 comprises two pluralities of coils which make it possible to ensure a redundancy in the event of a fault or malfunction of one plurality of coils, each plurality of coils having its own connections to the control system. The redundancy of the plurality of coils can also be used to double the power of the electromagnetic pumps to which the permanent magnets are subjected. It will also be noted that, still further the sake of optimization of the overall dimensions of the pump, only the plurality of coils is given redundancy, and as closely as possible to the permanent magnets.

The pump 400 can also be a side channel pump, still further called regenerative pump as explained previously in relation to the pump 300.

Figure 8:
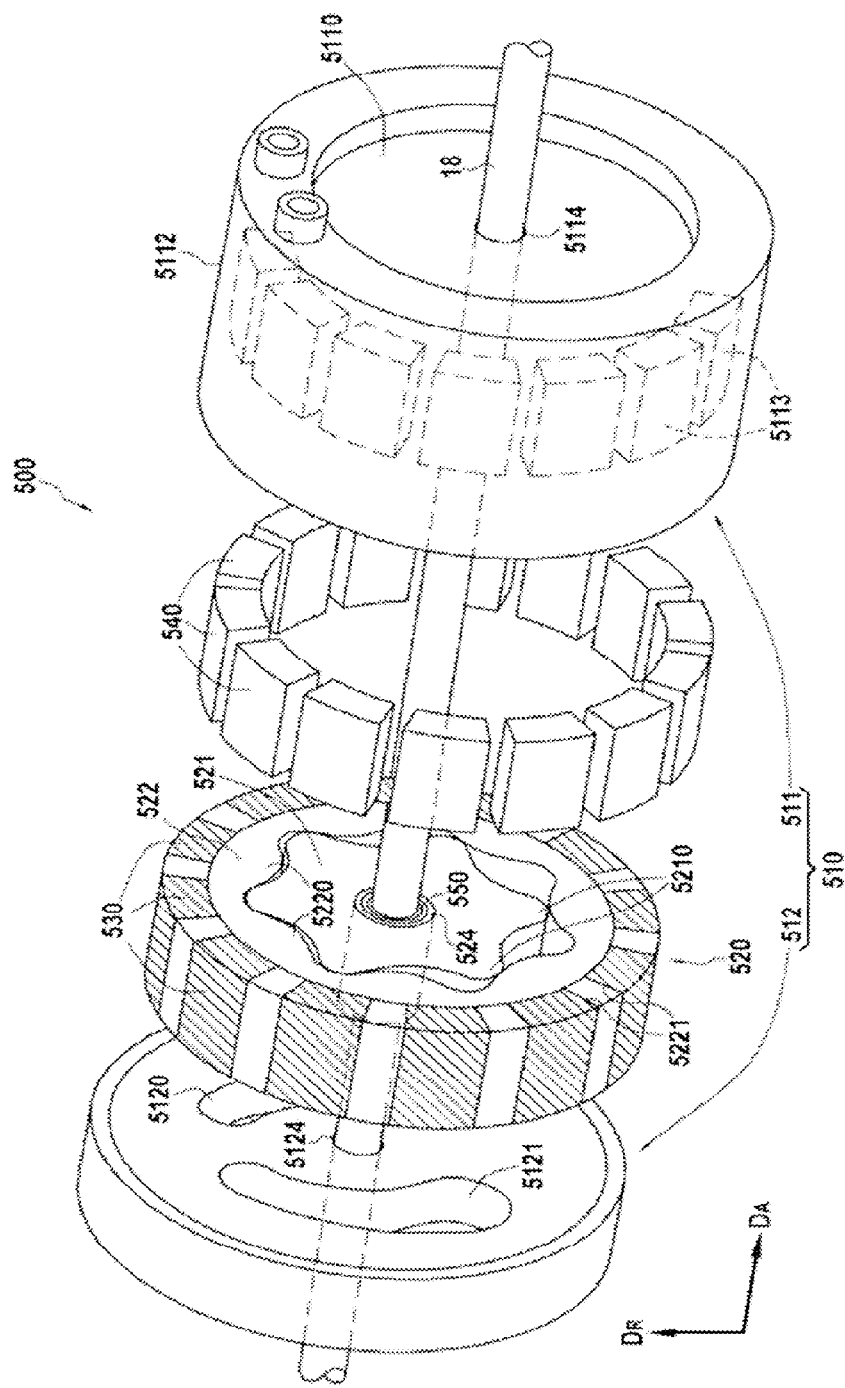
FIG. 8 is a schematic exploded perspective view of an electromagnetic pump in accordance with another embodiment of the invention.

FIG. 8 shows an electromagnetic pump 500 in accordance with another embodiment of the invention. In this embodiment, the pump 500 is a pump of gerotor type comprising a fixed pump body or stator 510 composed of a casing 511 and of a flange 512. The casing 511 includes a solid cylindrical central part 5110 and a circular outer wall 5112 extending concentrically around the central part 5110, annular housings 5113 being delimited between the central part 5110 and the outer wall 5112. The flange 512 includes a suction port 5120 and a discharge port 5121.

The electromagnetic pump 500 also comprises a rotor 520 comprising an inner pinion 521 and an outer ring 522 present around the inner pinion 521 along a radial direction $D_R$. The inner pinion comprises an outer tooth here composed of six teeth 5210 while the outer ring 522 comprises an inner toothing here composed of 7 teeth 5220.

The inner pinion 521 includes a bearing 524. Openings 5114 and 5124 are present on the casing 511 and the flange 512. The bearing 524 is intended to interact with a free wheel 550 here forming the one-way clutching element connecting the engine shaft 18 to the rotor 520 of the electromagnetic pump 500, the openings 5114 and 5124 allowing the passing of the engine shaft 18.

In pumps of gerotor type, a fluid is sucked in from the port 5120 and discharged via the port 5121 by capsules created between the teeth 5210 and 5220 of the inner pinion 521 and of the outer ring 522 respectively upon the rotation of these two elements.

The electromagnetic pump 500 further comprises a plurality of permanent magnets 530 annularly distributed on the outer periphery of the outer ring 522 and a plurality of coils 540 annularly distributed inside the fixed pump body or stator 510. More specifically, in the example described here, the permanent magnets 530 are retained in housings 5221 present in the outer ring 522 while the coils 540 are retained in the annular housings 5113 present in the casing 511.

Once all the component elements of the pump 500 have been assembled, the coils 540 are located face-to-face with permanent magnets 530 along an axial direction $D_A$. The controlling of the electromagnetic pump 500 (torque and rotation speed) is provided by control of the current flowing through the coils.

By attaching the permanent magnets 530 directly on the outer ring 522, a part of the driving means of the pump are directly integrated into the elements in movement, which makes it possible to obtain a high level of integration of the driving means and therefore a reduced overall bulk for the pump.

Furthermore, by placing the plurality of permanent magnets and the plurality of coils face-to-face along the axial direction, the radial bulk of the pump is greatly optimized. One thus obtains a very compact pump which can be driven independently with respect to the engine rating of the turbomachine with which it is associated.

The electromagnetic pump 500 can also be provided with a double coil as described for the pump 400 of FIG. 7. In this case, the pump comprises a second plurality of coils annularly distributed in housings present on the flange 512.

Figure 9:
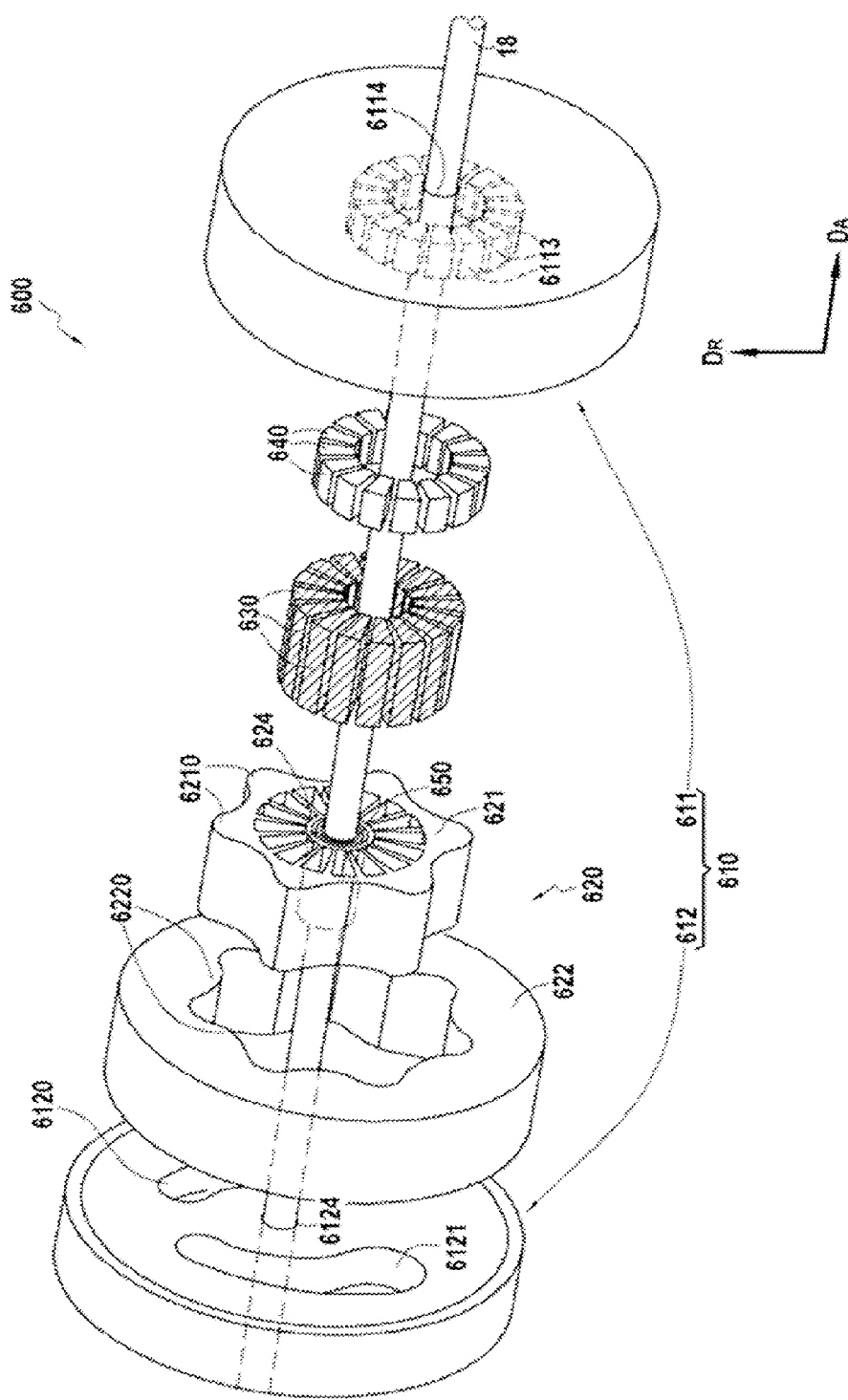
FIG. 9 is a schematic exploded perspective view of an electromagnetic pump in accordance with another embodiment of the invention.

FIG. 9 illustrates another embodiment of an electromagnetic pump 600 which differs from the electromagnetic pump 500 described in relation to FIG. 8 in that the permanent magnets are retained on the inner pinion. More specifically, as for the pump 500, the pump 600 of gerotor type comprises a fixed pump body or stator 610 composed of a casing 611 and of a flange 612. The casing 611 includes annular housings 6113. The flange 612 includes an intake port 6120 and a discharge port 6121.

The electromagnetic pump 600 also comprises a rotor 620 comprising an inner pinion 621 and an outer ring 622 present around the inner pinion 621 along a radial direction $D_R$. The inner pinion has an outer toothing here composed of six teeth 6210 while the outer ring 622 comprises an inner toothing here composed of 7 teeth 6220.

The inner pinion 621 includes a bearing 624. Openings 6114 and 6124 are present on the casing 611 and the flange 612 respectively. The bearing 624 is intended to interact with a free wheel 150 here forming the one-way clutching element connecting the engine shaft 18 to the rotor 620 of the electromagnetic pump 600, the openings 6114 and 6124 allowing the passing of the engine shaft 18.

The electromagnetic pump 600 further comprises a plurality of permanent magnets 630 annularly retained in the inner pinion 621 around the bearing 624 and a plurality of coils 640 retained in the annular housings 6113 present in the casing 611.

Once all the component elements of the pump 600 have been assembled, the coils 640 are then located face-to-face with the permanent magnets 630 along an axial direction $D_A$. The controlling of the electromagnetic pump 600 (torque and rotation speed) is provided by control of the current flowing through the coils.

By attaching the permanent magnets 630 directly onto the inner pinion 621, a part of the driving means of the pump are directly integrated into the elements in movement, which makes it possible to obtain a high level of integration of the driving means and therefore a reduced overall bulk of the pump.

Furthermore, by placing the plurality of permanent magnets and the plurality of coils face-to-face along the axial direction, the radial bulk of the pump is greatly optimized. One thus obtains a very compact pump which can be driven independently with respect to the engine rating of the turbomachine with which it is associated.

In the same way as for the pumps described previously, the electromagnetic pump 600 can be equipped with a double coil, namely comprise first and second pluralities of coils present on either side of the inner pinion respectively, the coils of the first and second pluralities of coils being face-to-face with the magnets along the axial direction.

Figure 10:
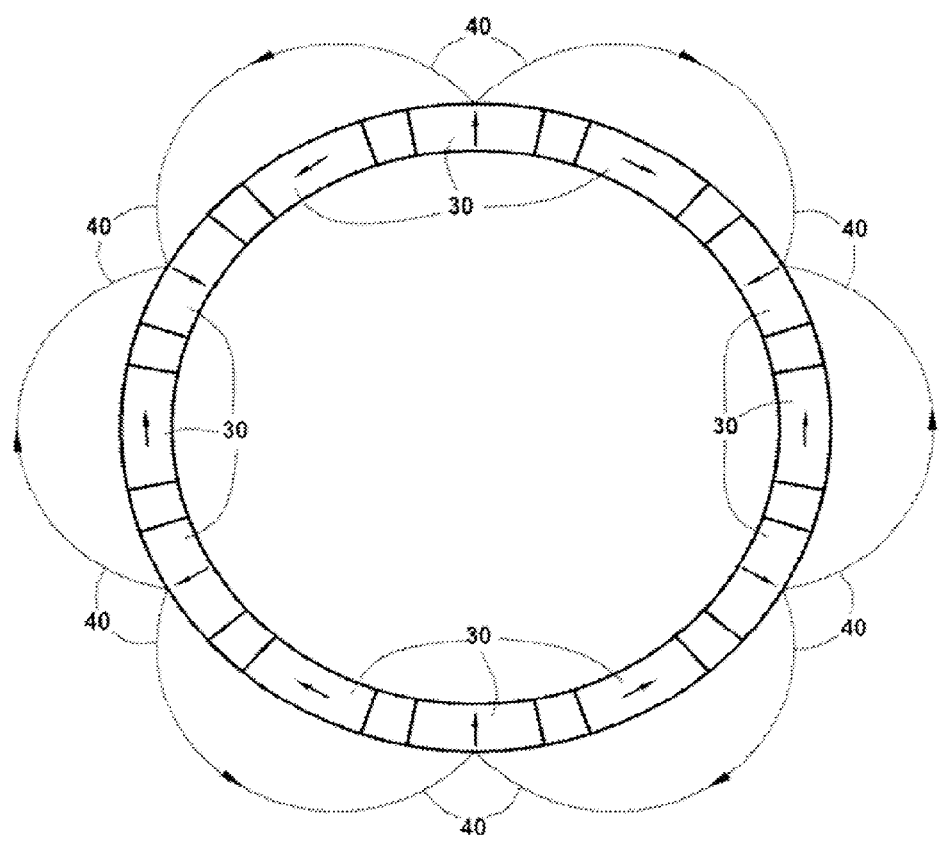
FIG. 10 shows an annular disposition of permanent magnets as a Halbach structure.

According to an additional feature of the invention, the permanent magnets present on the radially outer ends of the vanes of the vaned wheel for the embodiments described hereinabove in relation to FIGS. 2, 3, 6 and 7, or on the outer ring for the embodiments described hereinabove in relation to FIGS. 4, 5 and 8, or on the inner pinion for the embodiments described hereinabove in relation to FIG. 9 may be disposed as a Halbach structure. FIG. 10 illustrates an example of disposition of the permanent magnets as a Halbach structure. In this example, permanent magnets 30 are annularly distributed as in the rotors described previously while reversing the polarity of the magnets in the radial direction and in the circumferential direction as shown by the arrows indicated in FIG. 10. This particular disposition makes it possible to increase the magnetic field 40 on the outer side of the rotor while the magnetic field of the inner side of the rotor is substantially suppressed. The magnetic field loss is thus reduced, which improves the controlling of the rotor by the coils.

The one-way clutching element, such as for example the free wheel described hereinabove, makes it possible to selectively couple the rotor of the electromagnetic pump to the engine shaft used to control the centrifugal pump. It is thus possible to use the electromagnetic pump according to several modes of operation in the turbomachine.

A first operating mode corresponds to the priming of the fuel supply circuit of the turbomachine when the engine is switched off. At this stage, the fuel supply circuit may contain air following a total or partial draining of the supply circuit between the reservoir and the combustion chamber of the turbomachine. The presence of air significantly reduces the intake capacity of the centrifugal pump, which can even prevent engine start-up. A known solution of the prior art consists in equipping the reservoir with a priming pump, the so-called "feed pump", which makes it possible to fill the supply circuit between the reservoir and the engine. However, the implementation of a feed pump in a reservoir is complex and increases the mass of the assembly although the pump is only used for a possible priming before engine start-up.

In accordance with the invention, the priming of the fuel supply circuit is performed by commanding the electromagnetic pump from an independent source of electrical energy in order to fill the fuel supply circuit before engine start-up. In this first operating mode, the so-called "priming mode", the rotor of the electromagnetic pump rotates freely about the engine shaft, which is immobile owing to the presence of the one-way clutching element interposed between the rotor and the engine shaft.

A second operating mode, the so-called "boost mode", is implemented while the engine is ignited and the centrifugal pump is driven by the engine shaft. In this mode, the rotor of the electromagnetic pump is driven from an independent electrical energy source at a higher speed than the rotation speed of the engine shaft, which makes it possible to contribute an additional pumping capacity to the centrifugal pump. The one-way clutching element allows the rotor of the electromagnetic pump to rotate at a higher speed than the rotation speed of the engine shaft.

A third operating mode, the so-called "generator mode", is implemented while the engine is ignited the centrifugal pump is driven by the engine shaft. The electromagnetic pump is not supplied by an electrical energy source but its rotor is rotationally driven by the engine shaft owing to the presence of the one-way clutching element interposed between the rotor and the engine shaft. In this mode, the electromagnetic pump then converts into an electrical generator to produce an electrical current which can be drawn off the coils of the pump and stored in batteries to be used at a later time, for example to command the electromagnetic pump in the first and second operating modes.

The invention claimed is:

1. A fuel supply circuit of an aircraft engine connecting a fuel reservoir to a combustion chamber of a turbomachine, comprising:
    a low-pressure centrifugal pump mechanically coupled with an engine shaft; and
    an electromagnetic pump comprising a stator delimiting an annular internal volume in which is present a rotor able to drive a fluid, a plurality of magnets annularly distributed on the rotor, and a plurality of coils annularly distributed inside the stator face-to-face with the plurality of magnets,
    wherein the rotor is connected to the engine shaft by a one-way clutching element,
    wherein an inlet of the low-pressure centrifugal pump and an inlet of the electromagnetic pump are connected to the fuel reservoir such that the turbomachine can be supplied with fuel by the low-pressure centrifugal pump, by the electromagnetic pump, or by both the low-pressure centrifugal pump and the electromagnetic pump simultaneously, and
    wherein the rotor comprises an inner pinion interacting with an outer ring with an inner toothing, the magnets of the plurality of magnets being retained on the inner pinion, the coils of the plurality of coils being face-to-face with the magnets along an axial direction.

2. The circuit as claimed in claim 1, wherein the electromagnetic pump comprises first and second pluralities of coils present on either side of the pinion respectively, the coils of the first and second plurality of coils being face-to-face with the magnets along the axial direction.

3. The circuit as claimed in claim 1, wherein the electromagnetic pump is able to generate an electrical current.

4. An aircraft engine including a fuel supply circuit as claimed in claim 1.

5. The aircraft engine according to claim 4, wherein said fuel supply circuit is connected to the fuel reservoir without any priming pump.

6. The circuit as claimed in claim 1, wherein in a first operating mode, the electromagnetic pump is powered by an independent source of electrical energy, the rotor of the electromagnetic pump rotates freely about the engine shaft, and the engine shaft is immobile due to the one-way clutching element,
- wherein in a second operating mode, the low-pressure centrifugal pump is driven by the engine shaft, the electromagnetic pump is powered by the independent source of electrical energy, and the rotor of the electromagnetic pump rotates at a higher speed than a rotation speed of the engine shaft, and
- wherein in a third operating mode, the low-pressure centrifugal pump is driven by the engine shaft, the electromagnetic pump is not powered by the independent source of electrical energy, and the rotor of the electromagnetic pump is rotationally driven by the engine shaft due to the one-way clutching element to produce an electrical current.

* * * * *